United States Patent [19]

Sakagami et al.

[11] Patent Number: 4,572,905
[45] Date of Patent: Feb. 25, 1986

[54] SUBSTRATE FOR ANALYZING HYDROPHILIC SUBSTANCES OF LOW MOLECULAR WEIGHT

[75] Inventors: Teruo Sakagami; Noriyuki Arakawa, both of Iwaki, Japan

[73] Assignee: Kureha Kagaku Kogyo Kabushiki Kaisha, Tokyo, Japan

[21] Appl. No.: 608,212

[22] Filed: May 8, 1984

Related U.S. Application Data

[63] Continuation-in-part of Ser. No. 456,846, Jan. 10, 1983, abandoned.

[30] Foreign Application Priority Data

Feb. 26, 1982 [JP] Japan .................. 57-29892

[51] Int. Cl.$^4$ ............................ B01J 20/26
[52] U.S. Cl. ........................ 502/402; 502/9; 502/10
[58] Field of Search ............... 502/402, 9, 10

[56] References Cited

U.S. PATENT DOCUMENTS

4,171,283 10/1979 Nakashima et al. ............ 502/402
4,174,430 11/1979 Kido et al. ..................... 521/146
4,220,726 9/1980 Warshawsky ............... 502/402 X

FOREIGN PATENT DOCUMENTS

3004356 8/1980 Fed. Rep. of Germany .
955354 6/1949 France .
849122 9/1960 United Kingdom .
885720 12/1961 United Kingdom .
885719 12/1961 United Kingdom .
1116800 6/1968 United Kingdom .
2042557A 9/1980 United Kingdom .

OTHER PUBLICATIONS

Makromol. Chemie, 1966, vol. 98, pp. 42–57.
Z. Kunststoffe, 1960, vol. 50, pp. 375–380.
Beyer, Lehrbuch der Org. Chemie, 11/12th edition, 1968, p. 440.
Ch. R. Harrison et al., Makromol. Chem., 1975, vol. 176, No. 2, pp. 267–274.

*Primary Examiner*—Patrick P. Garvin
*Attorney, Agent, or Firm*—Cushman, Darby & Cushman

[57] ABSTRACT

Disclosed herein are a porous substrate for analyzing hydrophilic substances of low molecular weight, having an exclusive molecular weight of less than 30,000, comprising a cross-linked copolymer having methylol groups, the copolymer being made of a monomer of styrenes and a cross-linking agent copolymerizable with the monomer, the outer surface of the porous substrate being hydrophilic and the pore surface thereof being hydrophobic, and a process for producing the same.

17 Claims, 2 Drawing Figures

SUBSTRATE FOR ANALYZING HYDROPHILIC SUBSTANCES OF LOW MOLECULAR WEIGHT

CROSS-REFERENCE TO RELATED APPLICATION

The present application is a continuation-in-part of application Ser. No. 456 846 filed Jan. 10, 1983 and now abandoned.

SUMMARY OF THE INVENTION

In first aspect of the present invention, there is provided a porous substrate for analyzing hydrophilic substances of low molecular weight, having an exclusive molecular weight of less than 30000, comprising a cross-linked copolymer having methylol groups, the copolymer being made of a monomer of styrenes and a cross-linking agent copolymerizable with the monomer, the outer surface of the porous substrate being hydrophilic and the pore surface thereof being hydrophobic.

In second aspect of the present invention, there is provided a porous substrate for analyzing hydrophilic substances of low molecular weight, having an execlusive molecular weight of less than 30000 and having the phydrophilic outer surface thereof and the hydrophobic pore surface thereof, comprising a cross-linked copolymer having methylol groups and produced by subjecting a mixture of at least one monomer selected from styrene alpha-methylstyrene and chloromethylstyrenes and a cross-linking agent copolymerizable with the monomer to suspension copolymerization in an equeous solution of water-soluble high polymeric substance in the presence of a pore regulator, and introducing methylol groups into the thus obtained cross-linked copolymer.

In third aspect of the present invention, there is provided a process for preparing a porous substrate for analyzing hydrophilic substances having low molecular weight, comprising subjecting a mixture of a monomer of styrenes and a cross-linking agent copolymerizable with the monomer to suspension polymerization in an aqueous solution of water-soluble high polymeric substance in the presence of a pore regulator, said pore regulator providing the porous substrate with an exclusive molecular weight of less than 30,000, and introducing methylol groups into the resultant cross-linked copolymer.

BACKGROUND OF THE INVENTION

The present invention relates to a porous substrate for use in analysis of hydrophilic substance of low molecular weight and a process for producing the porous substrate. More particularly, the present invention relates to a porous substrate capable of analyzing hydrophilic substance of low molecular weight, which comprises a cross-linked copolymer having methylol groups and is produced by subjecting a monomeric mixture of at least one monomer selected from styrene, alpha-methylstyrene and chloromethylstyrenes and a cross-linking agent copolymerizable with the monomer to suspension copolymerization in an aqueous solution of a water-soluble high polymeric substance in the presence of a pore-regulator, and introducing methylol groups into the resultant cross-linked copolymer. The outer surface of the substrate is hydrophilic due to the water-soluble high polymeric substance which has been present in the polymerization and attached to the outer surface of the substrate, and the pore surface in the substrate is hydrophobic or less hydrophilic than the outer surface of the substrate.

Recently, the importance of a substrate capable of specifically interacting with a substance in a living body has been increased. Namely, as a result of frequent utilization of the high-speed liquid chromatography as a means of analyzing such a substance, the development of a substrate which is to be used in the high-speed liquid chromatography and provided with an excellent specific interaction with such a substance has been demanded. Particularly, for obtaining various informations from the chromatograph of a substance in a living body, which is relatively easily available such as urine, serum, etc., the substrate for use in high-speed liquid chromatography of such a substance is regarded as important. In addition, in the case where such a substrate can be dispersed in the urine and serum and has an interactive function with a specified substance, the substrate can be applied to affinity chromatography, and further, such a substrate is can be applied to antigen-antibody reaction.

Hitherto, as a process for producing cross-linked polymer of styrene or a derivative of styrene, a process of copolymerising styrene and a cross-linking agent copolymerizable with styrene in a state of suspension in water in the presence of a pore-regulator has been known, and for instance, process for producing copolymer of styrene and divinylbenzene (as a crosslinking agent) has been precisely described in J. Polymer Sci., Part A-2, 835 (1964). In the described process, wherein a water-soluble high polymeric substance is used as the major suspension stabilizer (suspending agent), although it is possible to produce fine particles of the cross-linked copolymer, an excessive amount of the water-soluble polymeric substance used in the polymerization in suspension adheres onto the surface of the fine particles of the cross-linked copolymer of styrene, and the thus adhered water-soluble high polymeric substance cannot be completely removed from the surface of the fine particles of the cross-linked copolymer even after repeated washing. In the case of applying the thus produced fine particles of the cross-linked copolymer as a substrate, for instance, in the gel-permeation chromatography (hereinafter referred to as GPC) combined with an organic solvent, the pressure necessary for carrying out the chromatography is larger than that in the ordinary case because of the viscous drag phenomenon occuring between the layer of the water-soluble high polymeric substance adhered onto the surface of the fine particles of the cross-linked copolymer and the fluid used in GPC, and together with the occurrence of a certain interaction of the water-soluble high polymeric substance with the component of the specimen to be analized, the phenomenon precluded the use of such a substrate in the liquid chromatography.

On the other hand, in cases where a phosphate such as calcium phophate, magnesium phosphate, etc. is used as the suspension stabilizer (suspending agent) instead of the water-soluble high polymeric substance, the phosphate adhered to the surface of the fine particles of the cross-linked copolymer is easily removable by washing the particles with an acid, etc., and clean particles of the cross-linked copolymer of styrene can be obtained. However, because of the hydrophobic property of the surface of the thus obtained fine particles of the cross-linked copolymer, the particles cannot be dispersed in water, various aqueous buffer solutions, serum and urine, and cannot absorb proteins within the pores thereof and accordingly, the process cannot solve the problem of offering a substrate for analyzing hydrophilic substances of low molecular weight which is the objective of the present invention.

As a result of studies of the present inventors, it has been found that by chemically introducing methylol groups into the dried porous microspherical particles of the cross-linked copolymer obtained by subjecting a monomeric mixture of at least one monomer selected from the group consisting of styrene, alphamethylstyrene and chloromethylstyrenes and a cross-linking agent copolymerizable with the monomer to suspension copolymerization in an aqueous solution of a water-soluble high polymeric substance as a suspension stabilizer (suspending agent) in the presence of a pore-regulator, a substrate having its outer surface rich in hydrophilicity and the pores of which the surface is partly hydrophilic, however, richer in hydrophobicity than the outer surface is obtained, and that such a substrate is favorably dispersible in serum, urine, etc. but is not able to take proteins into the pores thereof and does not adsorb the thus taken protein therein, and the present invention has been accomplished based on these findings.

BRIEF EXPLANATION OF DRAWING

Figure shows a chart recording elution peaks.

DETAILED DESCRIPTION OF THE INVENTION

Figure 1:
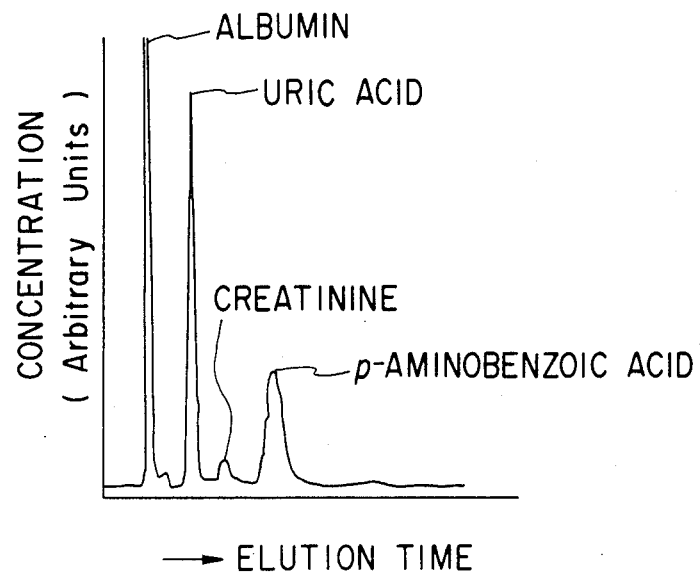

It is an object of the present invention to provide a porous substrate for analyzing hydrophilic substance having low mclecular weight.

Another object of the present invention is to provide a porous substrate of which the outer surface is highly hydrophilic and the pore surface of which is less hydrophilic than the outer surface, and the diameter of the pores of which is such that lower molecular weight substances can enter into the pores while the proteins normally present in serum can not enter into the pores.

Still another object of the present invention is to provide a process for producing the above-mentioned substrate.

The basic material of the porous substrate according to the present invention, namely, the porous fine particles made of cross-linked copolymer of a monomeric mixture of at least one monomer selected from the group consisting of styrene, alphamethylstyrene and chloromethylstyrenes and a cross-linking agent copolymerizable with the monomer is obtained by subjecting the monomeric mixture to suspension copolymerization in an aqueous solution of a water-soluble polymeric substance in the presence of a radical-type initiator and a pore-regulator.

As the cross-linking agent copolymerizable with at least one monomer selected from the group consisting of styrene, alphamethylstyrene and chloromethylstyrenes, the following compounds may be mentioned, for instance, divinylbenzene, trivinylbenzene, trially isocyanurate, dimethacrylate or diacrylate of polyvalent alcohol and diallyl phthalate. Of these compounds, divinylbenzene is most suitable because of the easiness of introduction of methylol groups into the thus obtained cross-liked copolymer, and it is preferable to use the cross-linking agent in an amount of 30 to 70% by weight of the total amount of the monomeric mixture. The most preferable cross-linked copolymer for the object of the present invention is that of styrene and divinyl-benzene.

As the radical-type initiator in the present invention, an initiator used in the conventional radical polymerization of a vinyl monomer in a state of aqueous suspension may be used, for instance, an organic peroxide such as benzoyl peroxide and butyl perbenzoate, an azo-compound such as azobisisobutyronitrile and the like. Benzoyl peroxide is preferably used in the present invention because of the relatively easy grafting of the water-soluble high polymeric substance to the cross-linked copolymer by the action of benzoyl peroxide.

As the water-soluble high polymeric substance, those water-soluble high polymeric substances in general, such as polyethylene oxide, polyvinyl alcohol, saponified products of polyvinyl acetate, polyvinylpyrrolidone, methylcellulose, etc. may be mentioned. In particular, according to the present invention, for the purpose of coating the outer surface of the cross-linked copolymer with good hydrophilicity, 5 to 60 parts, preferably 10 to 40 parts by weight of the water-soluble high polymeric substance is used per 100 parts by weight of the total amount of the monomeric mixture. In the case of using below 5 parts by weight, it is insufficient to coat the outer surface of the cross-linked copolymer with hydrophilicity, and on the other hand, in the case of using over 60 parts by weight, the viscosity of the system of polymerization becomes too large and accordingly, not only it is impossible to obtain complete microspherical particles of the cross-linked copolymer but also too much amount of the water-soluble high polymeric substance adheres on the outer surface of the cross-linked copolymer and gives unfavorable effects on the introduction of methylol groups.

In addition to the water-soluble high polymeric substance, an extremely small amount of a phosphate such as hydroxyapatite as a suspension stabilizer or an anionic surfactant may be added to the system of copolymerization. The control of the diameter of the fine particles of the cross-linked copolymer according to the present invention is possibly carried out by adjusting the amount of the water-soluble high polymeric substance the weight ratio of the monomeric mixture to water and the stirring power applied to the system, and in the case of using the surfactant, by adjusting the amount thereof. In the present invention, the cross-linked copolymer preperably consists of fine spherical particles of ordinarily 1 to 30$\mu$ in diameter.

The pore-regulator is used for adjusting the diameter of the opening of the pores (hereinafter referred to as pore size) formed on the outer surface of the microspherical particles of the cross-linked copolymer. Any organic solvent may be used as the pore regulator so far as it is soluble in the monomeric mixture. For instance, an aromatic hydrocarbon such as benzene, toluene, xylene and the like, a chlorohydrocarbon such as trichloroethylene, chloroform, carbon tetrachloride and the like and an aliphatic hydrocarbon such as n-hexane, n-heptane, n-octane, n-dodecane and the like, and the mixture thereof may be used as the pore-regulator.

Although the pore size of the microspherical particles of the cross-linked copolymer can be easily regulated by the kinds and/or the amount of the pore-regulator, ordinarily, it is preferable to use 20 to 300 parts by weight of the pore-regulator per 100 parts by weight of the total amount of the monomeric mixture, i.e., a mixture of at least one selected from the group consisting of styrene, alpha-methylstyrene and chloromethylstyrenes and a cross-linking agent copolymerizable with at least one selected from the group consisting of styrene, alpha-methylstyrene and chloromethylstyrenes. The pore size of the microspherical particles of the cross-linked copolymer is very important, because the pore size does not show any substantial change after methylol groups have been introduced into the cross-linked copolymer for converting thereof into the porous substrate according to the present invention, and the protein to be not adsorbed to the porous substrate enters into the porous substrate from the opening of the pore and is not adsorbed onto the pore surface. The pore size of the porous substrate according to the present invention is represented by the term "exclusive molecular weight" which means the minimum molecular weight of polystyrene which could not enter into the pores of the microspherical particles of the cross-linked copolymer measured by the following GPC test.

A series of authentic specimens of polystyrene of the respectively known average molecular weights are subjected to GPC while using the microspherical particles of the cross-linked copolymer as a stationary phase, and the minimum molecular weight of the polystyrene which cannot enter into the fine particles of the cross-linked copolymer is determined. Namely, in the case where the minimum molecular weight of polystyrene which cannot enter into the pores of the microspherical particles of the crosslinked copolymer from the opening of the pores thereof is, for instance, 30,000, it is said in the present invention that the pore size of the porous substrate obtained by introducing methylol groups into the microspherical particles of the cross-linked copolymer corresponds to the exclusive molecular weight of polystyrene of 30,000, and hereinafter, a porous substrate having such a pore size according to the present invention is referred to as "the porous substrate having the exclusive molecular weight of 30,000".

According to the present invention, the porous substrate having the exclusive molecular weight of less than 30,000 is preferable.

In the case where the porous microspherical particles of the cross-linked copolymer to the outer surface of which the water-soluble high polymeric substance adheres or is grafted is directly used for analyzing hydrophilic substance of low molecular weight thereon, although it is possible to disperse such particles in water, the hydrophilicity of the particle is still insufficient to allow the entrance and diffusion of a hydrophilic substance into and within the pores of the particle resulting in the problem of insufficient adsorbency for hydrophilic substance of low molecular weight. In addition, because of the presence of the water-soluble high polymeric substance on the outer surface of the particles, for instance, in the case where the particles are packed in a column, the necessary pressure for flowing a fluid through the column at a high speed is higher than in the conventional case of packing other substrate owing to the viscous drag phenomena between the layer of the water-soluble high polymeric substance and the fluid.

Accordingly, it is difficult to flow the fluid at a high speed in the column packed with such particles and the reproducibility of elution of such a column is very poor.

According to the present invention, the above-mentioned problem has been solved by introducing methylol groups into the above-mentioned fine porous spherical particles of the crosslinked copolymer. As the method for introducing methylol groups into the cross-linked copolymer, a method has been publicly known wherein the compound is at first chloromethylated, and then the thus introduced chloromethyl groups are subjected to hydrolysis to be methylol groups. As the method of chloromethylation, for instance, a method wherein formaldehyde or a derivative thereof and hydrogen chloride are used in the presence of zinc chloride as a catalyst and a method wherein chloromethyl methyl ether is used in the presence of aluminum chloride or tin tetrachloride as a catalyst may be mentioned.

The degree of chloromethylation is preferably such that not less than 0.2 group of chloromethyl group per one aromatic ring of the copolymer is introduced into the cross-linked copolymer from the viewpoint of offering an appropriate hydrophilicity to the resultant substrate having the methylol groups after hydrolysis. Namely, for instance, in the case of using chloromethyl methyl ether, the weight ratio of chloromethyl methyl ether to the cross-linked copolymer in chloromethylation is preferably 20:1 to 2:1, and more preferably 10:1 to 3:1 in consideration of the loss of the ether by evaporation during the reaction and the easiness of stirring in the reaction. Concerning the catalyst in Chloromethylation, although $ZnCl_2$, $AlCl_3$ or $SnCl_4$ is generally used in an anhydrous state thereof, anhydrous tin tetrachloride is mainly used in the present invention in consideration of the catalytic activities and the easiness of after-treatment of the reaction products. The weight ratio of the ether and the catalyst is selected suitably in the range of from 100:30 to 100:0.5, and the chloromethylation is carried out at a temperature of 0° to 58° C. (chloromethyl methyl ether boils at 58° C.).

In the case where the cross-linked copolymer of the present invention is subjected to chloromethylation, the water-soluble high polymeric substance present on the outer surface of the microspherical porous particles of the cross-linked copolymer is also subjected to the chemical reaction and as a result, the surface of the particles colours heavier than in the case where the water-soluble high polymeric substance is absent on the outer surface of the particles, and is tinted in brown. Because of the partial release of the chemically reacted water-soluble high polymeric substance from the outer surface of the chloromethylated particles of the cross-linked copolymer, in the case of utilizing the particles as a substrate, the problem of viscous drag phenomenon due to the water-soluble high polymeric substance on the outer surface of the particles of the cross-linked copolymer is almost solved.

The thus chloromethylated, cross-linked copolymer is subjected to hydrolysis in an alkaline medium at ordinary or a higher temperature, thereby chloromethyl groups are converted to methylol groups ($-CH_2OH$). Since the reaction rate is small in an aqueous sodium hydroxide solution, methanol is preferably added to the system for accelerating the reaction. The concentration of the alkali and the amount of methanol in the reaction system, the temperature and time of reaction may be selected according to the desired degree of introduction of methylol groups. It is preferable to carry out the hydrolysis to the extent of 50% or more of the theoretical. Accordingly, the number of methylol groups introduced into the cross-linked copolymer is preferably 0.1 or more per one aromatic ring of the thus produced porous substrate.

The porous substrate obtained by the above-mentioned process according to the present invention is more hydrophilic than the cross-linked copolymer due to the presence of the methylol groups, and accordingly extremely well dispersed in an aqueous medium. Moreover, even the pores surface thereof is provided with hydrophilicity and proteins can not enter in the pores and in addition, hydrophilic substances of low molecular weight can enter into the pores. Furthermore, since the pore surface is merely hydroxymethylated without adhesion of the watersoluble high polymeric substance, the hydrophilicity of the pore surface is less than that of the outer surface of the porous substrate due to the partially retained hydrophobic region. Accordingly, the hydrophilic substance of low molecular weight once entered into the pore is almost completely adsorbed hydrophobically in the pore. In addition, as has been mentioned, the excessive water-soluble high polymeric substance once adhered onto the outer surface of the particles of the cross-linked copolymer is released accompaying with chloromethylation. Therefore, even in the case where the substrate is packed in a column for the purpose of chromatography, a high fluid flow can be obtained without any problem of viscous drag problem and with a reproducible result of chromatography. Such a column can separate hydrophilic high polymer of a relatively low molecular weight. The porous substrate according to the present invention has been provided with the above-mentioned merits.

Furthermore, in a high-speed liquid chromatography the reproducibility is good and low molecular weight hydrophilic substances are well fractionated.

The thus produced porous substrate according to the present invention is preferably used as a substrate for analyzing and separating hydrophilic substance of low molecular weight, particularly in a continuous long-term chromatography, because substances of high molecular weight such as serum protein cannot enter into the porous substrate of the present invention from the opening of the pores therein and accordingly, are not adsorbed therein.

The present invention will be explained more in detail while referring to the following non-limitative examples.

EXAMPLE 1

In an autoclave, a solution of 12.5 g of methyl cellulose in 625 g of water containing 0.125 g of sodium lauryl sulfate was introduced, and after adding 21.8 g of styrene, 18.2 g of divinylbenzene and 60 g of toluene as a pore regulator into the autoclave, polymerization was initiated by addition of benzoyl peroxide as an initiator and carried out at 60° C. for 17 hours while stirring vigorously. The obtained polymer was washed thoroughly with water and then with acetone. The washed polymer was dried at 40° C. under reduced pressure. The diameter of the dried polymer is in the range of 3 to 20 μ. By subjecting the polymer to sifting, beads of 10 to 20 μ in diameter were collected. The exclusive molecular weight of the polymer was about 7000 which was determined by using polystyrene of known molecular weight and tetrahydrofuran as an eluent.

In 35 ml of chloromethyl methyl ether, 5 g of the particles (beads) and 1.5 ml of anhydrous tin tetrachloride were added, and the mixture was heated under a reflux condenser for 6 hours at about 50° to 60° C. The color of the beads became darker into blackish brown with the progress of reaction. After the reaction was over, the beads were washed several times in methanol containing hydrochloric acid and then with acetone to be yellow ocher in color. The degree of chloromethylation of the beads was about 0.62 chloromethyl group per one aromatic moiety, the degree being determined by comparing the infrared absorption peaks at 1600 cm$^{-1}$ due to aromatic moiety and at 1260 cm$^{-1}$ due to chloromethyl group with a calibration curve obtained from mixtures of cumene and p-isopropylbenzyl chloride of different mixing ratios.

The chloromethylated beads were heated in an aqueous 10% solution of sodium hydroxide at 60° C. for 9 hours to carry out hydrolysis. In the hydrolyzed beads, the strength of infrared absorption peak at 1260 cm$^{-1}$ due to chloromethyl group was reduced, and on the other hand, an absorption peak appeared at 1090 to 1100 cm$^{-1}$ due to C-O group. From the extent of reduction of the strength of peak at 1260 cm$^{-1}$, it was found that about 55% of chloromethyl groups had been converted to methylol groups, that is, the introduction of methylol groups into the beads was about 0.34 per one aromatic moiety.

The obtained beads of the invention was dispersed extremely well in water and various buffer solutions without recognizable coagulation or agglomeration.

After packing a strainless steel tube of 4 mm in diameter and 500 mm in length with the substrate of the invention, 20 μl of a mixture of p-aminobenzoic acid, creatinine and uric acid was subjected to chromatography while using the column and an aqueous 1/20 M phophoric buffer solution as an eluent. The conditions of chromatography were as follows; detector of ultraviolet at 250 nm, elution rate of 1 ml/min and a pressure of 20 kg/cm$^2$. The elution time was 10.4 min to p-aminobenzoic acid, 7.5 min to creatinine and 5.5 min to uric acid.

On the other hand, a mixture of bovine serum albumin and the three components mentioned above was subjected to chromatography on the same column. Albumin was eluted at first and the four components were completely separated from each other (refer to FIG. 1 which shows the elution curve). On repeating the chromatographic operation, the adsorption of albumin was observed only a little in the first and second repetition, however, not observed thereafter at all. Consequently, almost the same result was obtained thereafter.

Namely, it was found that the substrate of the invention was extremely suitable for analyzing water-soluble substances of low molecular weight and did not adsorb a protein of high molecular weight.

COMPARATIVE EXAMPLE 1

After packing the same stainless steel tube with the polymer prepared in Example 1 but not yet chloromethylated, the same specimen as in Example 1 was subjected to chromatography. The pressure showed a value higher than 80 kg/cm$^2$ at a flow rate of 1 ml/min, showing the large effect of the viscousness of methyl cellulose adhered on the pore surface in the polymer. The four components of the specimen were almost not separated from each other and eluted very rapidly.

COMPARATIVE EXAMPLE 2

Five grams of the polymer prepared in Example 1 was chloromethylated in the same method as in Example 1 except for the reaction time of 24 hours instead of 6 hours in Example 1 to obtain the beads of about 64% of the degree of chloromethylation. The beads were hydrolyzed in a solution of 25 g of sodium hydroxide in 100 g of methanol at 60° C. for 15 hours to obtain the substrate with about 0.58 (mean) methylol group per one aromatic moiety.

After packing the same stainless steel tube as in Example 1 with the substrate, a mixture of bovine serum albumin, p-aminobenzoic acid, creatinine and uric acid was subjected to chromatography while using the column at a flow rate of the same eluent of 1 ml/min, the elution times were as follows; p-aminobenzoic acid of 6.4 min, creatinine of 5.9 min and uric acid of 4.8 min.

Figure 2:
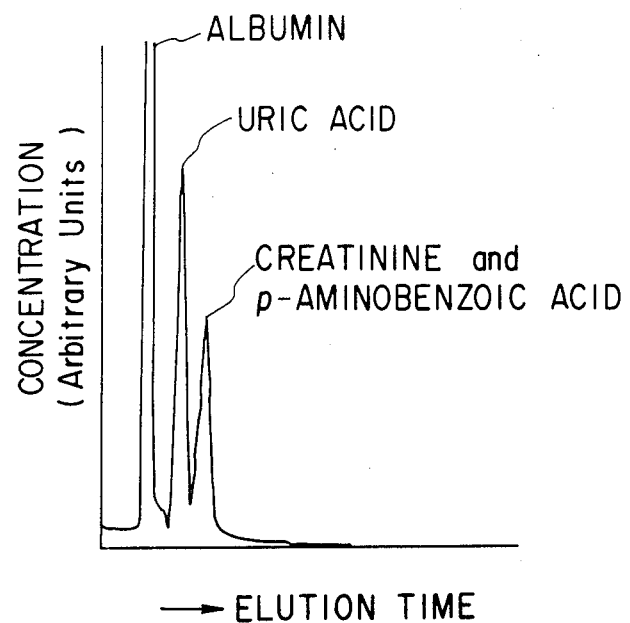

Namely, the elution time was shorter than in Example 1, and p-aminobenzoic acid and creatinine could not be separated from each other. The elution curve of the chromatography mentioned above is shown in FIG. 2. The results show the interation between the hydrophilic substances of low molecular weight and the pore surface in the substrate was larger in the substrate of the invention than in the substrate of this Comparative Example 2.

COMPARATIVE EXAMPLE 3

A styrene-divinylbenzene copolymer was prepared in the same manner as in Example 1 except for using 45 g of toluene and 15 g of n-dodecane as the pore regulators instead of 60 g of toluene. The exclusive molecular weight of the obtained polymer was about 100,000. Then methylol groups were introduced into the polymer in the same manner as in Example 1 to an extent of about 0.4 methylol group per one aromatic moiety.

After packing the same tube as in Example 1 with the obtained substrate, albumin was subjected to chromatography, however, albumin was adsorbed onto the column and did not eluted.

EXAMPLE 2

In a similar manner to that in Example 1, 21.8 g of styrene and 18.2 g of divinylbenzene were polymerized in the presence of 56.4 g of toluene and 3.6 g of n-dodecane as the pore regulator to obtain a styrene-divinylbenzene copolymer of an exclusive molecular weight of about 16,000. The copolymer was subjected to chloromethylation in the same conditions as in Example 1 except for 2 hours of reaction time instead of 6 hours in Example 1 to obtain a chloromethylated copolymer having an extent of chloromethylation of about 0.42 chloromethyl group per one aromatic moiety. By subjecting the copolymer to hydrolysis in an aqueous 10% solution of sodium hydroxide at 60° C. for about 5 hours, a substrate containing methylol group of about 0 2 (mean) per one aromatic moiety was obtained.

The column prepared by packing the same stainless steel tube as in Example 1 with the obtained substrate of the invention showed about 25 kg/cm$^2$ of pressure at a flow rate of 1 ml/min of an aqueous 1/20 M phosphoric buffer solution. The same amount, 20 μl, of a mixture of uric acid, creatinine and p-aminobenzoic acid was subjected to chromatography while using the column. The three components were completely separated. Test on a mixture of bovine serum albumin and the three components mentioned above showed that albumin was not adsorbed onto the column at all.

What is claimed is:

1. A porous substrate for analyzing hydrophilic substances of low molecular weight, having an exclusive molecular weight of less than 30,000, having a hydrophilic outer surface and a hydrophobic pore surface the substrate comprising a crosslinked copolymer having methylol groups and produced by subjecting a mixture of at least one monomer selected from styrene, alpha-methylstyrene and chloromethyl-styrenes and a cross-linking agent copolymerizable with the monomer to suspension copolymerization in an aqueous solution of 5 to 60 parts by weight of the water-soluble high polymeric substance per 100 parts by weight of the monomeric mixture of the monomer and the cross-linking agent in the presence of a pore regulator, and introducing methylol groups into the thus obtained cross-linked copolymer.

2. The substrate of claim 1, in which the cross-linking agent is selected from the group consisting of divinylbenzene, trivinylbenzene, triallyl isocyanurate, dimethacrylates and diacrylates of polyhydric alcohols and diallyl phthalate.

3. The substrate of claim 1, in which the copolymer is a styrene-divinylbenzene copolymer.

4. The substrate of claim 1, which is a spherical bead having a diameter in the range of 1 to 30μ.

5. The substrate of claim 1, which has 0.1 to 0.5 methylol group per one aromatic moiety.

6. A process for preparing a porous substrate for analyzing hydrophilic substances having low molecular weight, comprising
   (1) subjecting a mixture of a monomer of styrenes and a cross-linking agent copolymerizable with the monomer to suspension polymerization in an aqueous solution of 5 to 60 parts by weight of the water-soluble high polymeric substance per 100 parts by weight of the monomeric mixture of the monomer and the cross-linking agent in the presence of a pore regulator, said pore regulator providing the porous substrate with an exclusive molecular weight of less than 30,000, and
   (2) introducing methylol groups into the resultant crosslinked copolymer.

7. The process of claim 6, wherein the monomer of styrenes is selected from the group consisting of styrene, α-methylstyrene, chloromethylstyrene and a mixture thereof.

8. The process of claim 6, wherein the cross-linking agent is selected from the group consisting of divinylbenzene, trivinylbenzene, triallyl isocyanurate, dimethacrylates and diacrylates of polyhydric alcohols and diallyl phthalate.

9. The process of claim 6, wherein the monomer is styrene and the cross-linking agent is divinylbenzene.

10. The process of claim 6, wherein the amount of the cross-linking agent is in the range of 30 to 70% by weight to the total amount of the mixture of the monomer and the crosslinking agent.

11. The process of claim 6, wherein the water-soluble high polymeric substance is selected from the group consisting of polyethylene oxide, saponified polyvinyl acetates, polyvinyl alcohol, polyvinyl pyrrolidone and methyl cellulose.

12. The process of claim 6, wherein the amount of the water-soluble high polymeric substance is in the range of 10 to 40 parts by weight to 100 parts by weight of the mixture of the monomer and the cross-linking agent.

13. The process of claim 6, wherein the pore regulator is an organic solvent soluble in the monomer.

14. The process of claim 13, wherein the pore regulator is selected from the group consisting of an aromatic hydrocarbon, a chlorohydrocarbon, an aliphatic hydrocarbon and mixtures thereof.

15. The process of claim 14, wherein the aromatic hydrocarbon is benzene, toluene, or xylene, the chlorohydrocarbon is trichloroethylene, chloroform, or carbon tetrachloride, and the aliphatic hydrocarbon is n-hexane, n-heptane, n-octane, or n-dodecane.

16. The process of claim 6, wherein the amount of the pore regulator is in the range of 20 to 300 parts by weight to 100 parts by weight of the mixture of the monomer and the crosslinking agent.

17. The process of claim 6, wherein the resultant crosslinked copolymer is provided with methylol groups by chloromethylating the copolymer followed by hydrolysis.

* * * * *